(12) United States Patent
Oya et al.

(10) Patent No.: US 10,831,182 B2
(45) Date of Patent: Nov. 10, 2020

(54) WORK PROCESS MANAGEMENT SYSTEM AND TAG TYPE INDIVIDUAL CONTROLLER USED THEREIN

(71) Applicant: OMRON Corporation, Kyoto (JP)

(72) Inventors: Taku Oya, Kyoto (JP); Hiroyuki Yanagi, Mukou (JP); Nobuyuki Sakatani, Otsu (JP); Masanori Takahashi, Kyoto (JP); Yasuaki Abe, Soraku-gun (JP)

(73) Assignee: OMRON Corporation, Kyoto (JP)

( * ) Notice: Subject to any disclaimer, the term of this patent is extended or adjusted under 35 U.S.C. 154(b) by 278 days.

(21) Appl. No.: 15/121,990

(22) PCT Filed: Feb. 19, 2015

(86) PCT No.: PCT/JP2015/054524
§ 371 (c)(1),
(2) Date: Aug. 26, 2016

(87) PCT Pub. No.: WO2015/137070
PCT Pub. Date: Sep. 17, 2015

(65) Prior Publication Data
US 2017/0075346 A1    Mar. 16, 2017

(30) Foreign Application Priority Data

Mar. 14, 2014  (JP) .................. 2014-052346

(51) Int. Cl.
*G05B 19/418*    (2006.01)
(52) U.S. Cl.
CPC ... *G05B 19/41865* (2013.01); *G05B 19/4183* (2013.01); *G05B 19/41835* (2013.01);
(Continued)

(58) Field of Classification Search
None
See application file for complete search history.

(56) References Cited

U.S. PATENT DOCUMENTS

| | | | |
|---|---|---|---|
| 2002/0077723 | A1 | 6/2002 | Schoop |
| 2004/0162628 | A1 | 8/2004 | Mori |

(Continued)

FOREIGN PATENT DOCUMENTS

| | | |
|---|---|---|
| CN | 102291975 A | 12/2011 |
| CN | 102855389 A | 1/2013 |

(Continued)

OTHER PUBLICATIONS

Extended European search report (EESR) dated Dec. 14, 2017 in a counterpart European Patent application.
(Continued)

*Primary Examiner* — Eric C Wai
(74) *Attorney, Agent, or Firm* — Metrolex IP Law Group, PLLC (57) ABSTRACT

A work process management system includes at least one work device and a tag type individual controller that is directly or indirectly attached to a work object to control the work device. Each of the work device includes a work-device-side communicator, a work part, and a work-device-side control part. The tag type individual controller includes an individual-controller-side storage in which a work content of a work process performed with the work device is stored, an individual-controller-side communicator, and an individual-controller-side calculation controller that transmits the work content of the work process performed with the work device in which a performance result is reflected to the work-device-side communicator, and additionally stores the received performance result in the individual-controller-side storage.

8 Claims, 5 Drawing Sheets

(52) U.S. Cl.
CPC ............ *G05B 19/4189* (2013.01); *G05B 2219/31095* (2013.01); *G05B 2219/31395* (2013.01); *Y02P 90/02* (2015.11)

(56) References Cited

U.S. PATENT DOCUMENTS

| | | | |
|---|---|---|---|
| 2006/0091842 A1 | 5/2006 | Nishiyama | |
| 2008/0218349 A1 | 9/2008 | Maeda et al. | |
| 2011/0302776 A1 | 12/2011 | Kato et al. | |
| 2012/0229258 A1* | 9/2012 | Lim | G06K 7/10128 340/10.1 |
| 2014/0078060 A1* | 3/2014 | Leung | G06F 3/0354 345/161 |
| 2014/0282877 A1* | 9/2014 | Mahaffey | H04L 63/0853 726/3 |

FOREIGN PATENT DOCUMENTS

| | | |
|---|---|---|
| JP | 2611225 B2 | 5/1997 |
| JP | 2008-225588 A | 9/2008 |
| JP | 2009-087132 A | 4/2009 |
| JP | 2010-146090 A | 7/2010 |

OTHER PUBLICATIONS

Chinese Office Action (CNOA) dated Feb. 2, 2018 in a counterpart Chinese patent application.
Japanese Office Action dated Nov. 7, 2017 in a counterpart Japanese patent application.
Wu Chang-He et al., Modern Logistics Management Technology, the 1st edition, Jul. 31, 2008, p. 271-278, Lixin Accounting Publishing House, Shanghai; Relevance is indicated in the (translated) CNOA dated Oct. 24, 2018 in a counterpart Chinese patent application.
Cheng Dan, et al., E-commerce Practical Course, the 1st edition, Jun. 30, 2012, p. 172-178, Tsinghua University Press, Beijing; Relevance is indicated in the (translated) CNOA dated Oct. 24, 2018 in a counterpart Chinese patent application.
Chinese Office Action (CNOA) dated Oct. 24, 2018 in a counterpart Chinese patent application.
Office Action dated Sep. 25, 2018 in the counterpart European patent application.

\* cited by examiner

WORK PROCESS MANAGEMENT SYSTEM AND TAG TYPE INDIVIDUAL CONTROLLER USED THEREIN

TECHNICAL FIELD

The present invention relates to a work process management system that manages a work process of a production system and a tag type individual controller used in the work process management system in the production system that automatically produces a wide variety of product with a PLC (Programmable Logic Controller) that controls machines and devices according to a sequence program.

BACKGROUND ART

In conventional multi-product production, a product is managed in each kind, and the production is performed while a manufacturing process is rearranged each time by monitoring an order reception state and an order reception prediction of each product kind. However, in this method, a man-hour in the rearrangement and tuning of the device increases extremely in the case that the kind of the product to be produced increases extremely while the order reception state is unstable, or in the case that on-demand production is performed without the order reception prediction (product varies individually).

For example, it is assumed that three unknown commodities (A, B, and C) flow randomly on a line of processes of "component assembly with robot, appearance test with image sensor, and packaging with robot" as a multi-product production line.

Conventionally, the processes of "component assembly with robot, appearance test with image sensor, and packaging with robot" can hardly be performed on a common line. Because a shape and a weight depends on each product, tuning of a robot (for example, force necessary to hold a workpiece) or an image sensor (for example, focusing) is required every time, the tuning can hardly be performed when information about the product is unknown.

Patent Document 1 proposes "radio IC tag utilizing multi-product automatic production system with radio PLC". In the radio IC tag utilizing multi-product automatic production system with radio PLC, the kind of the product is identified by reading tag information from a radio IC tag attached to a workpiece, and a work program for the device on a production line is automatically changed.

In the production system of Patent Document 1, machines or devices (machine and the like) that can perform one or plural works on the workpiece, an IC tag reader that reads the tag information from the radio IC tag attached to the workpiece, and a radio PLC that that can receive and download a work program by radio and control operation of the machine by a work content according to the downloaded work program are provided in one or plural processes of the production line, and a computer that manages the processes is disposed. In the computer, the work program corresponding to the received tag information is downloaded to the corresponding radio PLC when the tag information is received from the IC tag reader disposed in the process, and the work program corresponding to the work associated with a kind change of the product is automatically downloaded to the corresponding radio PLC to automatically deal with the kind change of the product when the tag information associated with the kind change of the product is received.

However, in the conventional technology of Patent Document 1, it is necessary that a user program, an image processing item, and tuning setting value be previously stored in a PLC, an image sensor, and a robot with respect to all the presumed products, and it is necessary that the production line be automatically re-tuned each time by acquiring identification information about each product at the beginning of the process. Therefore, the tuning can hardly be performed when an unknown product that is not presumed in each device flows in the process.

In "RFID (Radio Frequency IDentification) system and RFID tag" proposed by Patent Document 2, not only a product kind but also a content of the processing to be performed are stored in a radio IC tag.

The RFID system of Patent Document 2 includes a detector that detects the RFID tag and a control part that performs control associated with the RFID tag, the RFID tag includes a first area in which ID information is stored and a second area in which command information is stored, and the control part includes determination means for determining whether access to the second area of the RFID tag is gained, extraction means for extracting command information from the second area when the determination of the access to the second area is made, and performance means for performing processing corresponding to the command information extracted with the extraction means.

On the other hand, Patent Document 3 proposes "unmanned carrier" that self-travels while loading the workpiece. The unmanned carrier can perform machining work management associated with the loaded workpiece by adding an information processing function to the unmanned carrier.

The unmanned carrier of Patent Document 3 is one that self-travels while loading a machining object. The unmanned carrier includes production management information storage means for storing a machining content applied to the machining object, product history information storage means for storing information specifying the machining object and information about a machining history applied to the machining object, running control means for storing a running path, for autonomously determining a station at which the machining should be performed and the running path to the station on the basis of information provided from an external device, and for running along the running path, machining work instruction means for outputting a machining work content called from the production management information storage means, and information communication means for transmitting and receiving information between one of the production management information storage means, the product history information storage means, and the running control means and the external device.

PRIOR ART DOCUMENTS

Patent Documents

Patent Document 1: Japanese Unexamined Patent Publication No. 2009-087132
Patent Document 2: Japanese Unexamined Patent Publication No. 2008-225588
Patent Document 3: Japanese Patent No. 2611225

SUMMARY OF THE INVENTION

Problems to be Solved by the Invention

However, even in the conventional technology of Patent Document 2, the free and flexible processing cannot always be performed beyond a command information range supposed by the control part that performs the control associated with the RFID tag included in the RFID system. Because the control part that performs the control associated with the RFID tag only has an initiative of the processing, for example, the processing content or sequence cannot largely be changed on the RFID tag side, or timing of starting the processing cannot be decided on the RFID tag side.

In the conventional technology of Patent Document 3, it is necessary to ensure a space such that the unmanned carrier can run in the production line of the factory, and it is difficult to directly apply the technology to the existing production line in which the conveyer and the like are provided.

An object of the present invention is to provide a work process management system and a tag type individual controller used therein. In the work process management system and the tag type individual controller, even for the unknown work object for the work device that performs the work process, the work process can automatically perform according to the work content suitable for the work object and the associated setting information, and necessity of the PLC that intensively manages and controls the work device is eliminated. Additionally, the work process management system can easily be applied to the existing production line.

Means for Solving the Problem

According to one aspect of the present invention, a work process management system includes: at least one work device configured to perform at least one work process on a work object; and a tag type individual controller that is directly or indirectly attached to the work object to control the work device.

The work device includes: a work-device-side communicator configured to conduct external radio communication; a work part configured to perform the work process; and a work-device-side control part configured to control the work process performed with the work part according to a command received through the work-device-side communicator.

The tag type individual controller includes: an individual-controller-side storage in which the work content of the work process is stored with respect to the work object of a corresponding kind; an individual-controller-side communicator configured to perform external radio communication; and an individual-controller-side calculation controller configured to transmit information in which a performance result of the work process performed by that time is reflected in the work content of the work process, which is performed with the work device and stored in the individual-controller-side storage, to the work-device-side communicator of the work device through the individual-controller-side communicator as the command to the work device, and configured to additionally store the performance result of the work process received from the work-device-side communicator through the individual-controller-side communicator in the individual-controller-side storage.

As used herein, the "work" is a high-level concept including not only "production" and "manufacturing" but also "assembly", "test", and "packing". Examples of the "work process management system" include a production management system or a manufacturing management system in a factory, but are not limited thereto. Examples of the "work device" include a defective determining device to which an image processing technology is applied and a P & P (Pick & Place) device that removes a component determined to be defective from the production line, but are not limited thereto. The "work content" includes not only the specific work content but also, for example, associated setting information. The "tag type individual controller" means one that includes a function of individually controlling the work device while having a shape like the radio IC tag.

In the work process management system having the above configuration, even for the unknown work object for the work device that performs the work process, the work process can automatically perform according to the work content suitable for the work object and the associated setting information, and necessity of the PLC that intensively manages and controls the work device is eliminated. Additionally, the work process management system can easily be applied to the existing production line. Because tag type individual controller includes the individual-controller-side calculation controller, the tag type individual controller side can perform the calculation associated with the work content of the work process and the associated setting information or the determination processing, and also freely and flexibly perform advanced processing. Because a burden on calculation processing of the control part on the work device can be reduced, the work device easily exerts original performance except for the calculation processing.

In the work process management system, the tag type individual controller may include a position detector configured to detect current position information, mounting position information indicating a position where each work device is mounted may previously be stored in the individual-controller-side storage, and the individual-controller-side calculation controller may properly select one of the work devices based on a calculation result of comparison between the mounting position information about each work device stored in the individual-controller-side storage and the current position information detected with the position detector.

The position detector of the tag type individual controller may detect the current position information based on initial position information on a work passage through which the work object is moved, moving speed information, and elapsed time information from start of the movement. Alternatively, the position detector of the tag type individual controller may detect the current position information by an indoor positioning scheme (for example, an indoor GPS). At least parts of the work content and the mounting position information, which are stored in the individual-controller-side storage of the tag type individual controller, may be received through the individual-controller-side communicator.

In the work process management system having the above configuration, the tag type individual controller side can select which one of the work devices perform the work process, and independently decide timing of starting the work process. On the work device side of the work process management system, it is not necessary to provide the image sensor or position sensor that detects the approach of the work object and the IC tag reader that reads a content of the radio IC tag.

In the work process management system, the tag type individual controller may include a power supply to which electric power is externally supplied by a non-contact electric power transmission scheme, the power supply being configured to supply the electric power to the individual-controller-side communicator, the position detector, the individual-controller-side storage, and the individual-controller-side calculation controller. The power supply may include a storage battery in which the electric power is stored.

Labor and time for management of a residual quantity of a built-in battery or battery exchange are saved in the work process management system having the above configuration. In the case that the power supply includes the storage battery, a freedom degree of the configuration of the production line increases, and convenience of the tag type individual controller is enhanced.

The present invention also includes the tag type individual controller per se used in the work process management system.

Effect of the Invention

In the work process management system of the present invention and the tag type individual controller used therein, even for the unknown work object for the work device that performs the work process, the work process can automatically perform according to the work content suitable for the work object and the associated setting information, and necessity of the PLC that intensively manages and controls the work device is eliminated. Additionally, the work process management system can easily be applied to the existing production line. Because tag type individual controller includes the individual-controller-side calculation controller, the tag type individual controller side can perform the calculation associated with the work content of the work process and the associated setting information or the determination processing, and also freely and flexibly perform advanced processing. Because the burden on the calculation processing of the control part on the work device can be reduced, the work device easily exerts original performance except for the calculation processing.

MODE FOR CARRYING OUT THE INVENTION

Hereinafter, a production management system 100 according to an embodiment of the present invention will be described with reference to the drawings. The present invention can be applied to not only production management or manufacturing management in a factory but also a system that manages a wide range of various kinds of work. At this point, the term "work" is used as a high-level concept of "production", "manufacturing", and the like.

<Schematic Configuration of Production Management System 100>

Figure 1:
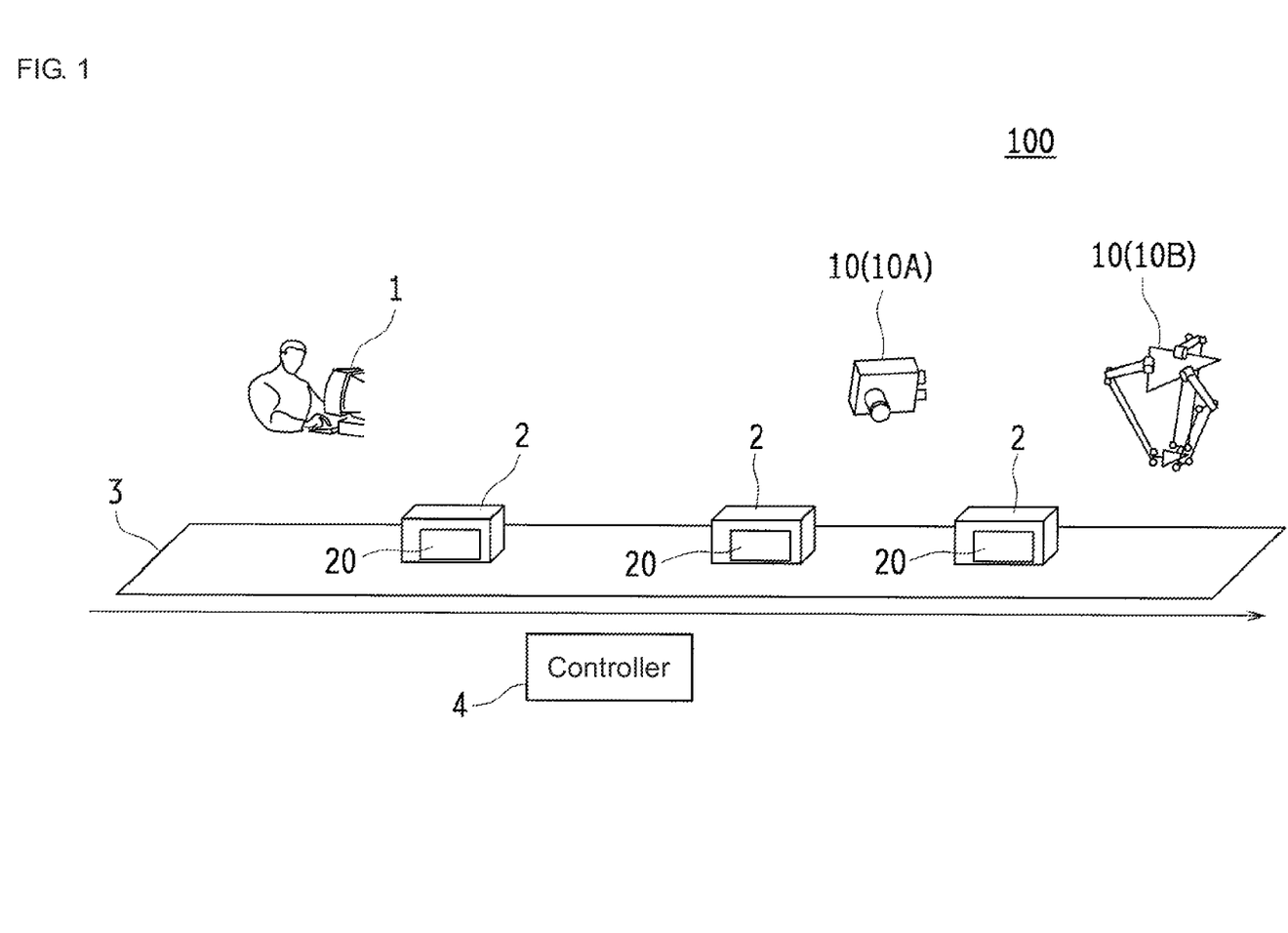
FIG. 1 is an overview diagram of a production management system 100 according to an embodiment of the present invention.

FIG. 1 is an overview diagram of the production management system 100 according to an embodiment of the present invention. The production management system 100 includes at least one work device 10 and a tag type controller 20. The work device 10 performs at least one work process such as a production process and a test process on each workpiece 2 (work object), such as various components or products, which flow on a conveyer 3 that is a part of a production line. The tag type controller 20 is attached to each workpiece 2, and controls each work device 10 such that the work device 10 is caused to perform the work process corresponding to a kind of the workpiece 2.

An image processing device 10A and a P & P device 10B are cited as an example of the work device 10. The image processing device 10A detects a shape or a size of the workpiece 2 or checks an abnormality of an appearance on the basis of an imaging result of the workpiece 2, and determines whether the workpiece 2 is defective, and the P & P device 10B removes the workpiece 2 from the conveyer 3 according to an external command. Additionally, examples of the work device 10 include an assembling device, a test device, and a packing device, but are not limited thereto. The image processing device 10A and the P & P device 10B are collectively called the work device 10 unless required to be distinguished from each other.

The tag type controller 20 is directly or indirectly attached to each workpiece 2 similarly to the conventional radio IC tag or RFID tag. For example, when the workpiece 2 is relatively large, the tag type controller 20 may directly adhere to a side surface of the workpiece 2. On the other hand, when the workpiece 2 is relatively small, the tag type controller 20 may be attached to a container that accommodates the workpiece 2. Depending on the shape of the workpiece 2, the tag type controller 20 can be attached to a stage on which the workpiece 2 is placed.

A user PC 1 includes a radio communication interface, and conducts radio communication with the tag type controller 20 as necessary. The detailed radio communication is described later.

In the conveyer 3, a conveyer driving controller 4 controls start and stop of drive and a drive speed. Each workpiece 2 on the conveyer 3 usually moves at a constant speed, and such the work processes as the production process and the test process are sequentially performed with the work devices 10 disposed along the conveyer 3.

Figure 2:
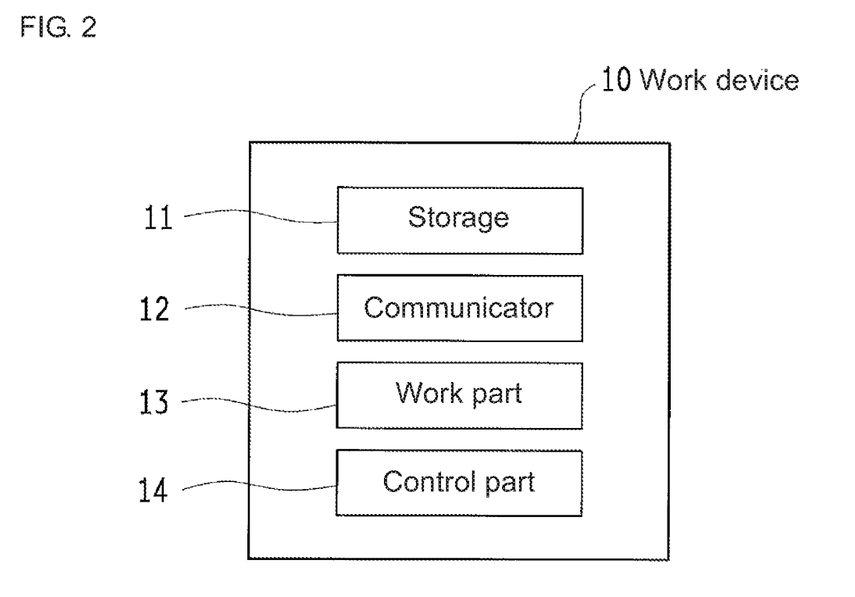
FIG. 2 is a schematic diagram illustrating a basic configuration common to each work device 10 in the production management system 100.

FIG. 2 is a schematic diagram illustrating a basic configuration common to each work device 10 in the production management system 100. As illustrated in FIG. 2, each work device 10 includes a storage 11, a work part 13, a communicator 12, and a control part 14.

A work-process work content and work-process-associated setting information are stored in the storage 11. Various pieces of data during the work and work result information may be stored in the storage 11. Examples of the work content and associated setting information, which are dealt with the image processing device 10A, include a processing item, a true value data (true value image data, shape information, and current position), real image data, and a non-defective and defective determination result, but are not limited thereto. A command value to the P & P device 10B is cited as an example of the data dealt with the image processing device 10A, but the data is not limited thereto.

The communicator 12 includes a radio transmitter and receiver and an antenna, and conducts the radio communication with the outside (for example, the tag type controller 20).

It is not always necessary for the communicator 12 per se to conduct the radio communication. For example, the communicator 12 can conduct only wired network communication while being connected to a radio router, and the communicator 12 may conduct the radio communication with the outside through the radio router.

The work part 13 performs the work process on the basis of the work content and associated setting information, which are stored in the storage 11

As need arises, the control part 14 updates at least a part of the work content and associated setting information, which are stored in the storage 11, according to a command received through the communicator 12. The performance of the work process with the work part 13 is controlled on the basis of the updated work content and associated setting information.

It is not always necessary to provide the storage 11, it is not always necessary to store the work content of the work process and the associated setting information in the storage 11, and it is not always necessary for the control part 14 to update the work content stored in the storage 11 as needed. For example, the control part 14 may control the work process performed with the work part 13 according to the command received through the communicator 12.

Figure 3:
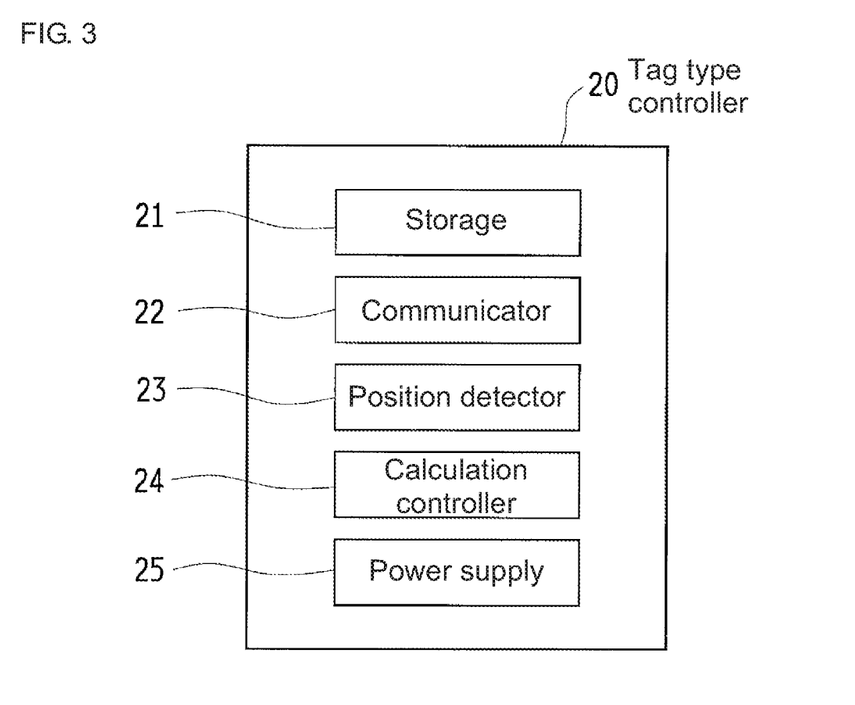
FIG. 3 is a schematic diagram illustrating a configuration of a tag type controller 20 used in the production management system 100.

FIG. 3 is a schematic diagram illustrating a configuration of the tag type controller 20 used in the production management system 100. As illustrated in FIG. 3, each tag type controller 20 includes a storage 21, a position detector 23, a communicator 22, a calculation controller 24, and a power supply 25.

The work content, which is performed with the work device 10 on the kind of the workpiece 2 corresponding to the tag type controller 20 in each work process, and the associated setting information are stored in the storage 21. A position where each work device 10 is disposed is also previously stored in the storage 21.

The communicator 22 includes a radio transmitter and receiver and an antenna, and conducts the radio communication with the outside such as the user PC 1. The work content and associated setting information, which are stored in the storage 21, are received from the outside such as the user PC 1 through the communicator 22.

The position detector 23 detects the current position on the conveyer 3 on the basis of an initial position and a moving speed on the conveyer 3 and an elapsed time since the start of the movement. The moving speed on the conveyer 3 may be acquired from the conveyer driving controller 4 through the communicator 22.

The calculation controller 24 transmits a command, which is issued to the work device 10, to the communicator 12 on the side of the work device 10 through the communicator 12. In the command, each work process performance result is reflected in the work content and associated setting information of the work process performed with the work device 10, the work content and associated setting information being stored in the storage 21. The calculation controller 24 additionally stores the work process performance result received from the communicator 12 through the communicator 22 in the storage 21.

The power supply 25 supplies power to the storage 21, the position detector 23, the communicator 22, and the calculation controller 24. For example, the power supply 25 may be a button battery similarly to the active IC tag. If possible, preferably electric power is externally supplied by a non-contact electric power transmission scheme (for example, adoption of electromagnetic induction) such that labor and time for management of a battery residual quantity or battery exchange are saved. For the adoption of the electromagnetic induction, for example, a magnetic force generation device may be disposed below or around the conveyer 3.

A storage battery, which stores the externally-supplied electric power therein and discharges the electric power as needed, may be included. Therefore, the magnetic force generation device needs not to be disposed everyplace along the conveyer 3, or the storage battery can be charged in another place except for the conveyer 3.

Currently, from the viewpoint of supposed cost, the tag type controller 20 is preferably detached from the workpiece 2 to be recovered and reused after the use in the production line. However, the tag type controller 20 is not necessarily recovered and reused. For example, necessity of the recovery is lowered when cost is reduced like the current radio IC tag. For example, both the cost reduction of the tag type controller 20 and the compact tag type controller 20 enables a system configuration in which the tag type controller 20 is previously incorporated in the workpiece 2.

<Work Process Performed with Production Management System 100>

Figure 4:
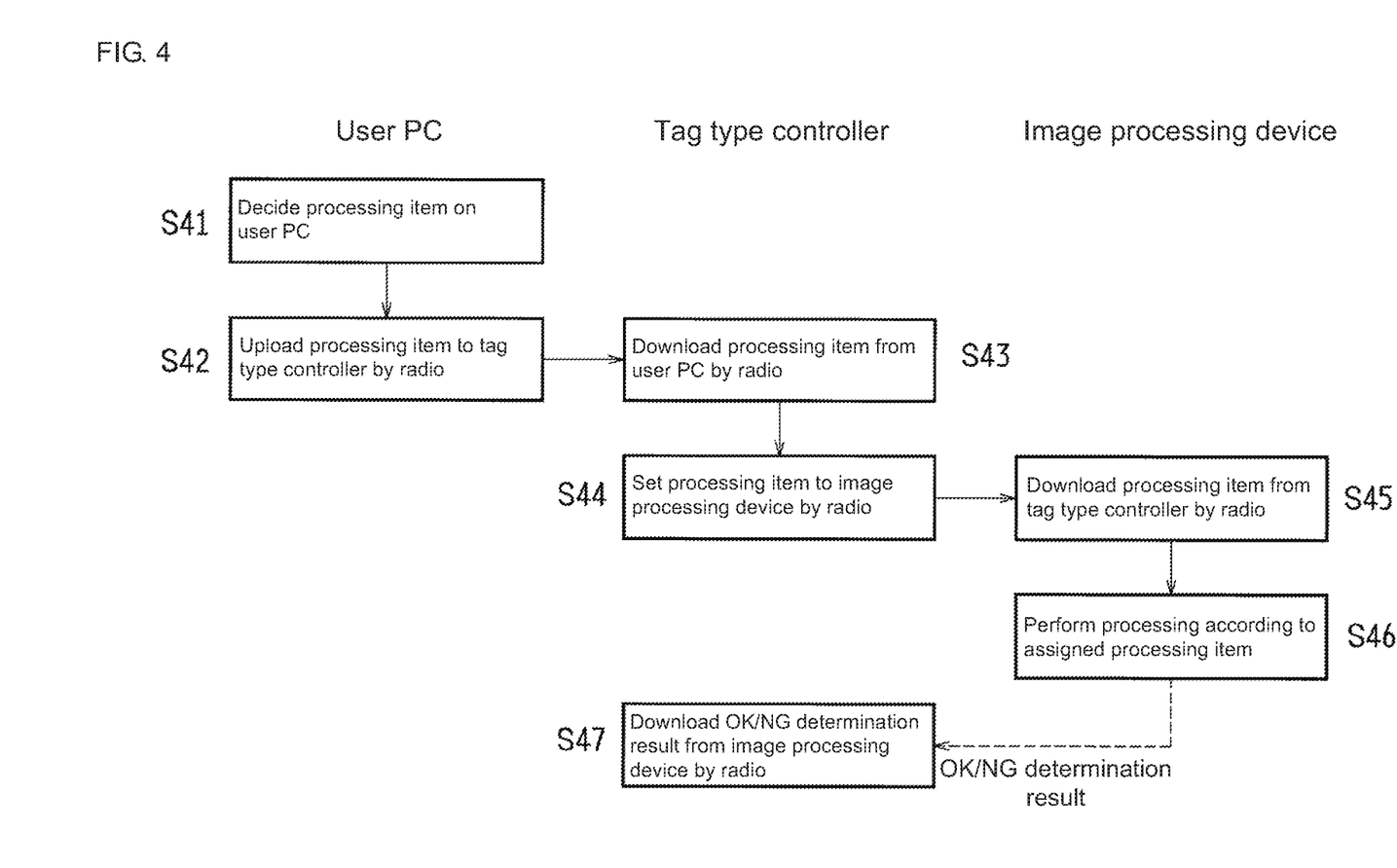
FIG. 4 is a schematic diagram illustrating a sequence of a work process performed with an image processing device 10A.

FIG. 4 is a schematic diagram illustrating a sequence of the work process performed with the image processing device 10A.

First, a user decides a processing item on the user PC 1 (step S41). The processing item is uploaded from the user PC 1 to the tag type controller 20 by radio (step S42). On the side of the tag type controller 20, the processing item is downloaded from the user PC 1 by radio (step S43).

The tag type controller 20 sets the processing item to the image processing device 10A by radio (step S44). On the side of the image processing device 10A, the processing item is downloaded from the tag type controller 20 by radio (step S45).

The image processing device 10A performs necessary processing according to the assigned processing item (step S46), and uploads an OK/NG determination result of the processing by radio. On the side of the tag type controller 20, the OK/NG determination result is downloaded from the image processing device 10A by radio (step S47).

Figure 5:
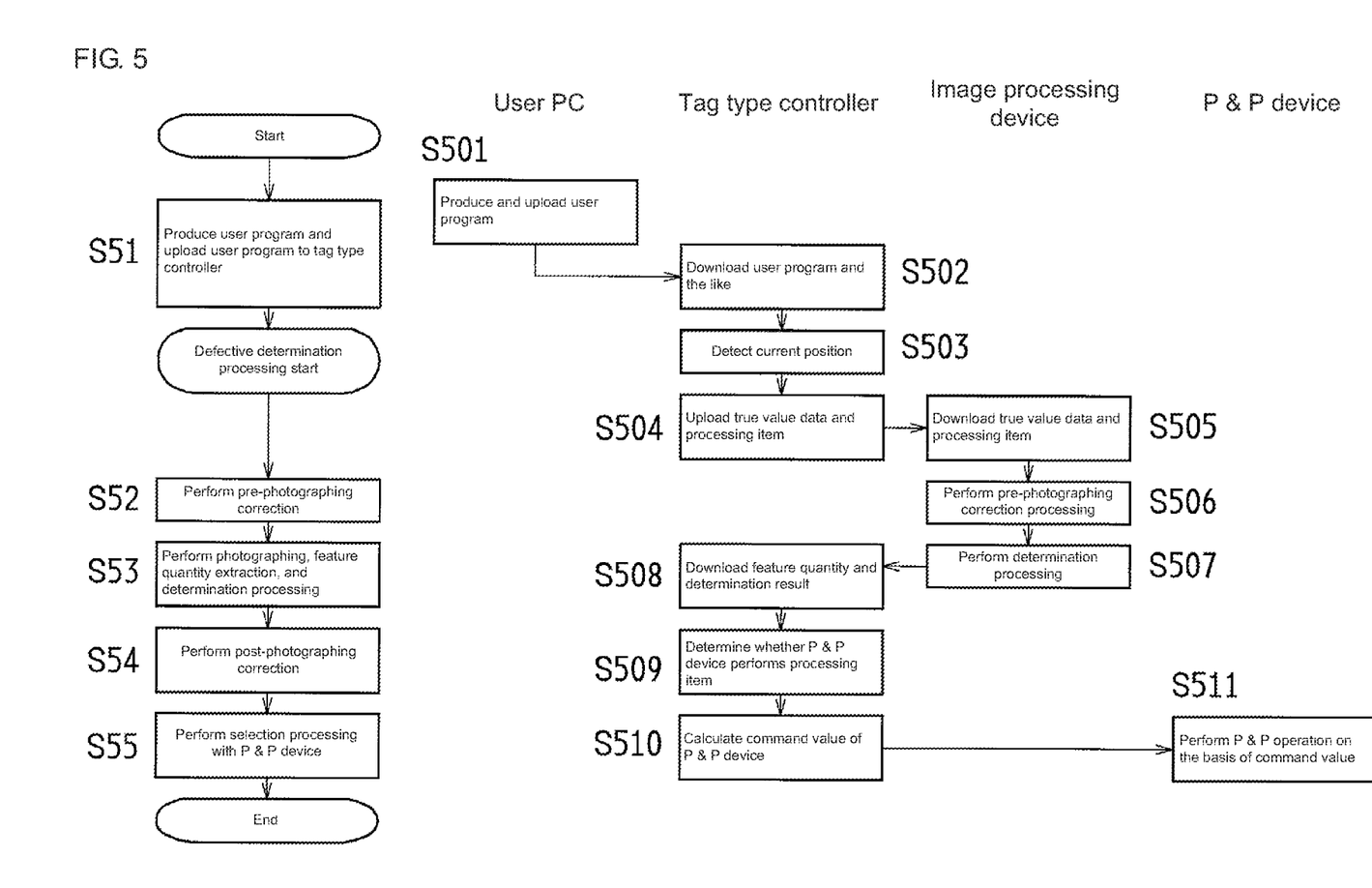
FIG. 5 is a schematic diagram illustrating a flowchart and a sequence of the work processes performs with an image processing device 10A and a P & P device 10B while the flowchart and the sequence are compared to each other.

FIG. 5 is a schematic diagram illustrating a flowchart and a sequence of the work processes performed with the image processing device 10A and the P & P device 10B while the flowchart and the sequence are compared to each other.

The flow in FIG. 5 is started from the production of the user program and the upload of the user program to the tag type controller 20 (step S51).

The work process, namely, the defective determination processing starts from the time the image processing device 10A determines that the work process can be performed.

First, pre-photographing correction processing is performed (step S52). Then, photographing, feature quantity extraction, and determination processing are performed (step S53). Post-photographing correction is performed (step S54). Finally, selection processing is performed with the P & P device 10B (step S55).

As to the sequence corresponding to the flow, a user produces a user program on the user PC 1, and uploads the user program to the tag type controller 20 by radio (step S501). The user program is downloaded in the side of the tag type controller 20 (step S502).

The tag type controller 20 detects the current position on the conveyer 3 in a continuous manner or at regular intervals using the position detector 23 (step S503), and calculates a distance relative to the image processing device 10A from comparison to the position of the image processing device 10A, which is stored in the storage 21.

When determining that the tag type controller 20 sufficiently approaches the image processing device 10A, the tag type controller 20 uploads the true value data and the processing item to the image processing device 10A by radio as preparation of the work process performed with the image processing device 10A (step S504). The side of the image processing device 10A downloads the true value data and the processing item (step S505).

The image processing device 10A performs the pre-photographing correction processing (step S506), performs the photographing, the feature quantity extraction, and the determination processing (step S507), and uploads the feature quantity and the determination result to the tag type controller 20. The feature quantity and the determination result are downloaded on the side of the tag type controller 20 (step S508).

The tag type controller 20 determines whether the P & P device 10B performs the processing item (step S509). When determining that the P & P device 10B performs the processing item, the tag type controller 20 calculates the command value to the P & P device 10B (step S510), and uploads the command value to the P & P device 10B.

On the side of the P & P device 10B, after the command value is downloaded, the P & P (Pick & Place) operation is performed on the basis of the command value (step S511).

Figure 6:
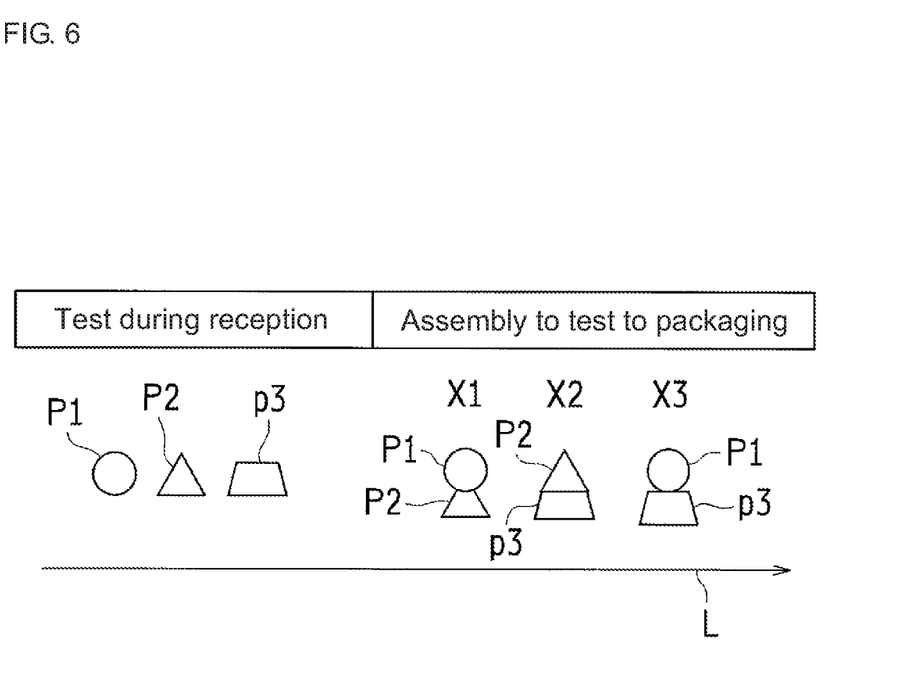
FIG. 6 is a schematic diagram illustrating multi-product production performed by the production management system 100.

FIG. 6 is a schematic diagram illustrating the multi-product production performed by the production management system 100. It is assumed that a commodity X1 constructed with a product P1 and a product P2, a commodity X2 constructed with the product P2 and a component p3, and a commodity X3 constructed with the product P1 and the component p3 are produced using the product P1, the product P2, and the component p3 as an example of the multi-product production.

In the conventional technology, when the test during reception is performed on the product P1, the product P2, and the component p3 on one line, it is necessary to rearrange a configuration of the line in each time or to change the work contents or various settings of a line assembly device or a test device. Alternatively, it is necessary to individually provide each line according to the product P1, the product P2, and the component p3. After division of the product P1, product P2, and component p3 is performed subsequent to the test during reception, it is necessary to individually perform a sequence of processes of the assembly, test, and packaging on each of the commodity X1, commodity X2, and commodity X3 on each line.

On the other hand, in the production management system 100, the test during reception can be performed on the product P1, the product P2, and the component p3 on the same line L as illustrated in FIG. 6. Further, it is possible to perform the sequence of processes of the assembly, test, and packaging on the commodity X1, commodity X2, and commodity X3 on the same line L without performing the division after the test during reception.

<Modification of Production Management System 100>

In the position detector 23 included in the tag type controller 20, it is assumed that the moving speed of the conveyer 3 on which each workpiece 2 is carried is kept constant, and that the initial position on the conveyer 3, the moving speed, and the elapsed time from the start of the movement can be recognized. However, the production line is not always constructed with one conveyer 3.

For example, a configuration that detects the current position using an indoor positioning scheme such as the indoor GPS may be adopted instead of the configuration of the position detector 23. Therefore, the restriction to the conveyer 3 of the production line is eliminated to enhance convenience of the tag type controller 20. At this point, it is necessary that the indoor positioning scheme such as the indoor GPS can be adopted in a factory in which the production line is disposed.

Various changes and modifications can be made without departing from the gist or principal feature of the present invention. The above embodiment is described for illustrative purpose only, and limited interpretation should be avoided. The scope of the present invention is defined only by the claims, but not bound to the description of the embodiment. The changes and modifications equivalent to the claims are included in the present invention.

This application claims the priority based on Japanese Patent Application No. 2014-052346 filed with the Japan Patent Office on Mar. 14, 2014, the entire contents of which are incorporated herein by reference.

INDUSTRIAL APPLICABILITY

The present invention can be applied to not only the production management system or manufacturing management system in the factory but also various systems that manage a wide range of various kinds of work.

DESCRIPTION OF SYMBOLS 1 user PC
2 workpiece
3 conveyer
4 conveyer driving controller
10 work device
10A image processing device
10B P & P device
11 storage
12 communicator
13 work part
14 control part
20 tag type controller
21 storage
22 communicator
23 position detector
24 calculation controller
25 power supply
100 production management system
P1 product
P2 product
p3 component
X1 commodity
X2 commodity
X3 commodity

The invention claimed is:

1. A work process management system comprising:
at least one work device performing at least one work process on a work object; and
a tag type individual controller that is directly or indirectly attached to the work object to control the work device, wherein:
the work device comprises:
a work-device-side communicator communicating with the tag type individual controller;
a work part performing the work process; and a work-device-side control part controlling the work part performing the work process according to a command received from the tag type individual controller through the work-device-side communicator, and the tag type individual controller comprises:

a position detector;

an individual-controller-side storage storing work content of the work process performed on the work object;

an individual-controller-side communicator communicating with the work-device-side communicator; and an individual-controller-side calculation controller configured with a program to perform operations comprising:

causing the position detector to detect, at regular intervals, a current position of the tag type individual controller and the work object, calculating a distance relative to the work device based on comparing position information of the work device stored in the individual-controller-side storage and the detected current position, calculating the command to transmit to the work-device-side communicator based on a performance result of a completed portion of the work process that is reflected in the work content of the work process, the command comprising work content to be performed by the work device and setting information comprising a configuration necessary for the work device to perform the work content, after determining, based on the comparing the position information, that the tag type individual controller sufficiently approaches the work device, causing the individual-controller-side communicator to transmit the command to the work-device-side communicator of the work device through the individual-controller-side communicator, causing the individual-controller-side communicator to receive an additional performance result, the additional performance result based on the work device performing the work process according to the command, from the work-device-side communicator through the individual-controller-side communicator, and storing the additional performance result in the individual-controller-side storage to be reflected in the work content.

2. The work process management system according to claim 1, wherein mounting position information indicating a position where each work device is mounted is stored in the individual-controller-side storage, and the individual-controller-side calculation controller selects one work device based on a calculation result of comparison between the mounting position information about each work device stored in the individual-controller-side storage and the current position detected with the position detector.

3. The work process management system according to claim 2, wherein the position detector of the tag type individual controller detects the current position based on initial position information on a work passage through which the work object is moved, moving speed information, and elapsed time information from start of the movement.

4. The work process management system according to claim 2, wherein the position detector of the tag type individual controller detects the current position by an indoor positioning scheme.

5. The work process management system according to claim 2, wherein at least parts of the work content and the mounting position information, which are stored in the individual-controller-side storage of the tag type individual controller, are received through the individual-controller-side communicator.

6. The work process management system according to claim 2, wherein the tag type individual controller further comprises a power supply to which electric power is externally supplied by a non-contact electric power transmission scheme, the power supply being configured to supply the electric power to the individual-controller-side communicator, the position detector, the individual-controller-side storage, and the individual-controller-side calculation controller.

7. The work process management system according to claim 6, wherein the power supply further comprises a storage battery in which the electric power is stored.

8. A tag type individual controller used in the work process management system according to claim 1.

* * * * *